(12) United States Patent
Sawada et al.

(10) Patent No.: US 7,793,651 B2
(45) Date of Patent: Sep. 14, 2010

(54) HEAT STORAGE APPARATUS

(75) Inventors: Takashi Sawada, Nara (JP); Hirotaka Kaneko, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 560 days.

(21) Appl. No.: 11/392,594

(22) Filed: Mar. 30, 2006

(65) Prior Publication Data

US 2006/0218954 A1 Oct. 5, 2006

(30) Foreign Application Priority Data

Mar. 31, 2005 (JP) ............................. 2005-102188

(51) Int. Cl.
*F24H 7/00* (2006.01)
(52) U.S. Cl. ...................... 126/400; 126/618; 126/643; 165/12.48 R; 165/104; 165/152; 165/166; 62/238.6; 62/434
(58) Field of Classification Search ................. 126/400, 126/618, 643; 62/238.6, 434, 73, 48; 165/902, 165/104.12, 48 R, 152, 10, 166, 180
See application file for complete search history.

(56) References Cited

U.S. PATENT DOCUMENTS

| 3,886,998 | A | * | 6/1975 | Rowekamp | 165/49 |
|---|---|---|---|---|---|
| 3,996,759 | A | * | 12/1976 | Meckler | 62/170 |
| 4,237,859 | A | * | 12/1980 | Goettl | 126/400 |
| 4,293,033 | A | * | 10/1981 | Nasser | 165/166 |
| 4,393,924 | A | * | 7/1983 | Asami et al. | 165/104.12 |
| 4,407,358 | A | * | 10/1983 | Muellejans et al. | 165/166 |
| 4,491,172 | A | * | 1/1985 | Hitchin | 165/10 |
| 5,490,559 | A | * | 2/1996 | Dinulescu | 165/148 |
| 5,957,193 | A | * | 9/1999 | Kanada | 165/10 |
| 5,992,508 | A | * | 11/1999 | Lowenstein et al. | 165/46 |
| 6,019,170 | A | * | 2/2000 | Yokoya et al. | 165/166 |
| 6,615,906 | B1 | * | 9/2003 | Fieback et al. | 165/10 |
| 6,843,311 | B2 | * | 1/2005 | Evans et al. | 165/167 |
| 6,854,513 | B2 | * | 2/2005 | Shirota et al. | 165/203 |

FOREIGN PATENT DOCUMENTS

| EP | 0 045 548 | 2/1982 |
|---|---|---|
| JP | 59-60188 | 4/1984 |
| JP | 2003-232563 | 8/2003 |
| JP | 2004-245449 | 9/2004 |

* cited by examiner

*Primary Examiner*—Steven B McAllister
*Assistant Examiner*—Avinash Savani
(74) *Attorney, Agent, or Firm*—Bacon & Thomas, PLLC

(57) ABSTRACT

A heat storage apparatus includes heat storage panels having primary fluid passages formed therein; passage plates having secondary fluid passages formed therein; and heat reservoirs. The heat storage panels and the passage plates are layered alternately, and the heat reservoirs are interposed between the heat storage panels and the passage plates in such a manner that the heat reservoirs, the heat storage panels and the passage plates are adhered to one another. Protrusions are formed on surfaces of the heat storage panels in such a manner that the heat reservoirs are supported by the protrusions.

13 Claims, 10 Drawing Sheets

HEAT STORAGE APPARATUS

FIELD OF THE INVENTION

The present invention relates to a heat storage apparatus; and, more particularly, to a heat storage apparatus used for hot water supply or heating.

BACKGROUND OF THE INVENTION

A conventional heat storage apparatuses is configured such that a heat exchanger is installed in a heat storage tank filled with heat storage medium. In this configuration, circulating water heated by a heat source is delivered to the heat exchanger in the heat storage tank to store heat in the heat storage medium, and cold water supplied through a cold water supply pipe gets heated with the heat extracted from the heat storage medium when it is circulated through the heat exchange, the thus heated water being outputted through a hot water supply pipe (see, for example, Japanese Patent Laid-Open Application No. 2003-232563).

FIG. 10 shows a configuration diagram of the conventional heat storage apparatus disclosed in Japanese Patent Laid-Open Application No. 2003-232563. As shown therein, the conventional heat storage apparatus includes heat storage tank 1, heat storage medium 2, heat exchanger 3, circulating pump 4, heat source 5, hot water supply pipe 6 and cold water supply pipe 7.

However, in accordance with the conventional heat storage apparatus, since the heat is transferred to/from heat storage medium 2 by way of heat exchanger 3, an utilization rate of heat storage medium 2 is reduced, especially in case when a heat pump is employed as a heat source 5, wherein the efficiency is more decreased more noticeably due to an indirect heat exchange of the heat during the heat storage.

SUMMARY OF THE INVENTION

It is, therefore, an object of the present invention to provide a high-efficiency heat storage apparatus by improving the effectiveness of the heat storage medium.

In accordance with one aspect of the present invention, there is provided a heat storage apparatus, including heat storage panels having primary fluid passages formed therein; passage plates having secondary fluid passages formed therein; and heat reservoirs, wherein the heat storage panels and the passage plates are layered alternately, and the heat reservoirs are interposed between the heat storage panels and the passage plates in such a manner that the heat reservoirs, the heat storage panels and the passage plates are adhered to one another. With this configuration, the heat reservoirs are layered in such a manner that they are disposed between the heat storage panels having the primary fluid passages and the passage plates having secondary fluid passages, so that the heat storage medium can be filled up with a high density. Further, heat can be transferred directly from the heat source to the heat reservoirs, so that the heat can be transferred from the heat source to the heat reservoirs with a high efficiency.

Preferably, protrusions are formed on surfaces of the heat storage panels in such a manner that the heat reservoirs are supported by the protrusions. With this configuration, the heat storage panels having the primary fluid passages can be supported by the heat reservoirs, so that the heat storage medium can be filled up with a high density. Further, heat can be transferred directly from the heat source to the heat reservoirs, so that the heat can be transferred from the heat source to the heat reservoirs with a high efficiency.

Preferably, the heat storage panels include section bars made of extruded aluminum, and corrosion protecting films are formed on outer surfaces of the section bars. With this configuration, the heat storage apparatus can be made lighter, and the heat conductivity from the primary fluid to the heat reservoirs can be enhanced. Further, a corrosion of the aluminum section bars can be prevented even when the heat storage medium is corrosive. Thus, it is possible to implement a light and reliable heat storage apparatus with a high efficiency.

Preferably, the passage plates are formed of copper plates, and corrosion protecting films are formed on outer surfaces of the copper plates. With this configuration, the heat conductivity from the heat reservoirs to the secondary fluid can be enhanced, and a corrosion of the copper can be prevented even when the heat storage medium is corrosive. Thus, it is possible to implement a reliable heat storage apparatus with a high efficiency.

Preferably, the heat reservoirs include envelope-shaped containers having thin films, and heat storage media are stored in the envelope-shaped containers. With this configuration, metal of the heat storage panels can be prevented from directly contacting the heat storage medium in the passage plates. Thus, a corrosion of the metal can be prevented, and the heat storage medium can be protected from the deterioration due to an ion elution from the metal.

Preferably, via protrusions having through holes and fixing protrusions having female threads are formed at sides of each of the section bars in the heat storage panels in such a manner that the heat storage panels are fixed to the passage plates. With this configuration, the heat storage panels are layered, and fasteners, e.g., bolts, are inserted into the through holes of the via protrusions to be fixed into the female threads of the fixing protrusions. Thus, the layered heat storage panels can be bound tightly without additional means.

Preferably, the heat storage apparatus further includes a heat storage medium temperature detector; a heat storage medium vibrator; and a controller for controlling an operation of the heat storage medium vibrator based on an output of the heat storage medium temperature detector. With this configuration, the heat storage medium temperature detector detects whether the temperature of the heat storage medium has reached about the freezing point or the melting point, and, if so, the controller activates the heat storage medium vibrator to be vibrated, vibrating heat storage medium to boost the freezing reaction. Thus, the latent heat can be extracted at a specific temperature.

Preferably, outer surfaces of the heat storage apparatus are covered with vacuum insulators, and bound by binding members. With this configuration, a heat radiation from the heat storage apparatus can be reduced, thereby allowing a high-efficiency operation.

In accordance with another aspect of the present invention, there is provided a hot water supplier, including a heat pump circuit having a compressor; a heat radiator; an expansion valve; an evaporator; and a heat exchanger for exchanging heat between the heat radiator and the evaporator, wherein the compressor, the heat radiator, the expansion valve and the evaporator are connected serially in this order, and wherein the heat storage panels described above are used for the heat radiator. With this configuration, the heat storage medium can be heated directly by the coolant of the heat pump circuit without secondary heat transfer medium. Thus, a high-efficiency heat storage can be achieved.

Preferably, the hot water supplier further includes passage plates; and end plates for binding and supporting the heat storage panels and the passage plates, the end plates including a compressor inlet passageway and a radiator outlet passageway used for the heat exchanger, wherein he heat storage panels and the passage plates are layered alternately. With this configuration, the end plates can be configured as a single body with the heat exchanger, thereby allowing a small-sized and high-efficiency heat storage apparatus.

BRIEF DESCRIPTION OF THE DRAWINGS

The above and other objects and features of the present invention will become apparent from the following description of preferred embodiments, given in conjunction with the accompanying drawings, in which.

DETAILED DESCRIPTION OF THE PREFERRED EMBODIMENT

Hereinafter, preferred embodiments in accordance with the present invention will be described with reference to the accompanying drawings. However, the present invention should not be construed to be limited thereto.

Embodiment 1

Figure 1:
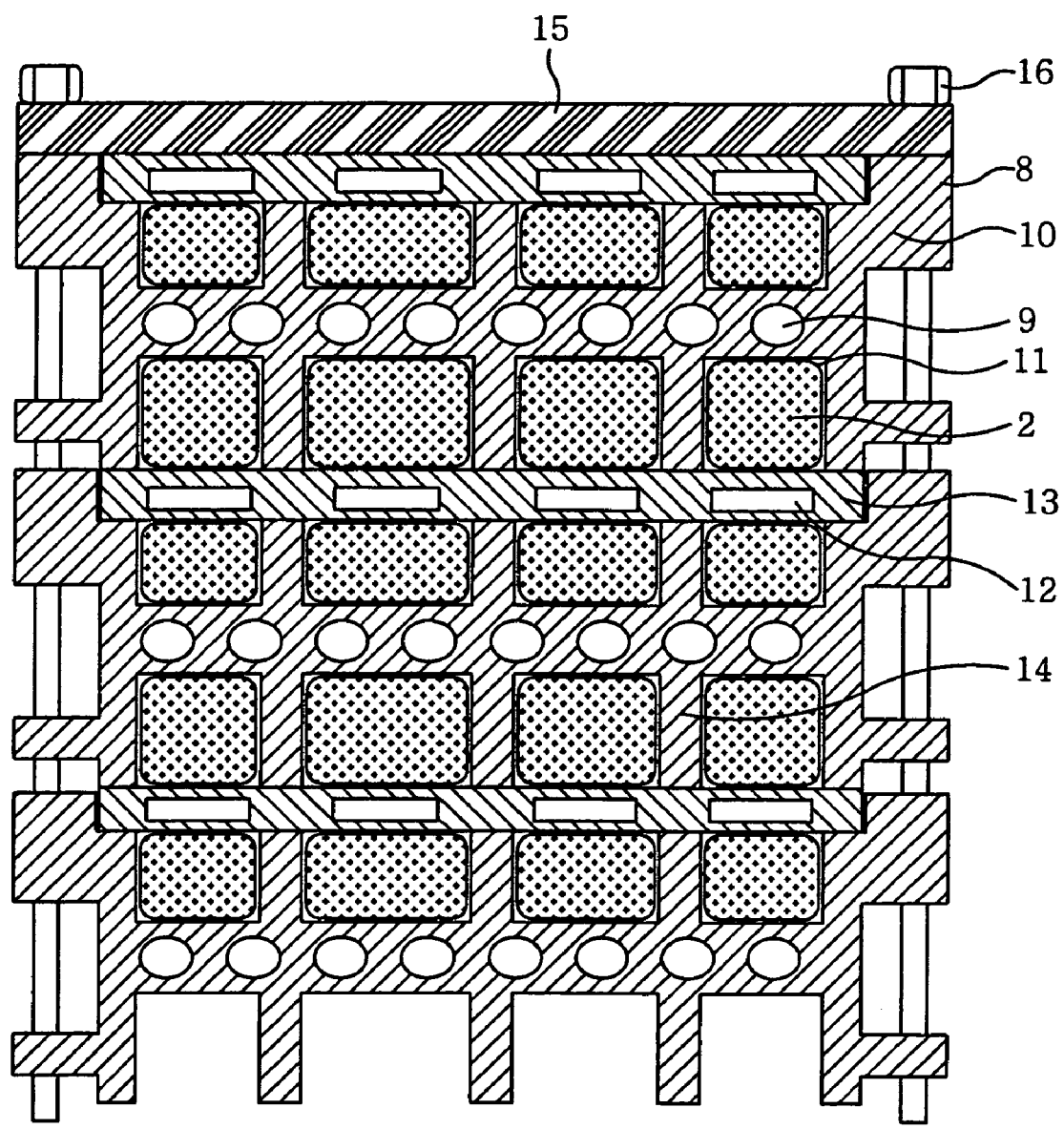
FIG. 1 shows a configuration diagram of a heat storage apparatus in accordance with a first embodiment of the present invention.

FIG. 1 shows a configuration diagram of a heat storage apparatus in accordance with a first embodiment of the present invention.

As shown therein, heat storage panel 8 includes section bars 10 having primary fluid passages 9 formed therein, and supports at one or two sides of section bars 10 heat reservoirs 11 containing heat storage medium 2. Passage plates 13 having secondary fluid passages 12 formed therein are layered in such a manner that they are adhered to a plurality of protrusions 14. Further, heat reservoirs 11 are adhered to heat storage panel 8 and passage plates 13, and end plates 15 forming end portions of the heat storage apparatus are fixed to heat storage panel 8 by fasteners 16 such as bolts. The protrusions 14 support passage plates 13, and heat reservoirs 11 are interposed between the protrusions 14.

Hereinafter, the operations and the performances of the heat storage apparatus configured as above will be described.

Firstly, as for heat storage, heat reservoirs 11 are heated by primary fluid of high temperature flowing through primary fluid passage 9, thereby allowing heat to be stored in heat storage medium 2. As for heat release, secondary fluid of low temperature is made to flow through secondary fluid passages 12 in passage plates 13, thereby allowing heat to be transferred from heat storage medium 2 in heat reservoir 11 to secondary fluid.

As described above, in accordance with the first embodiment, heat storage panel 8 and passage plates 13 supporting heat reservoirs 11 are alternately layered and fixed by fasteners 16, allowing passage plates 13 to be fixed to the protrusions 14, heat reservoirs 11 to be adhered on sections bars and passage plates 13 to be layered. By configuring so, a pressure resistance of passage plates 13 is enhanced, and heat reservoirs 2 are filled up to a high density, allowing heat to be transferred more efficiently during the heat storage and the heat release Embodiment 2

Figure 2A:
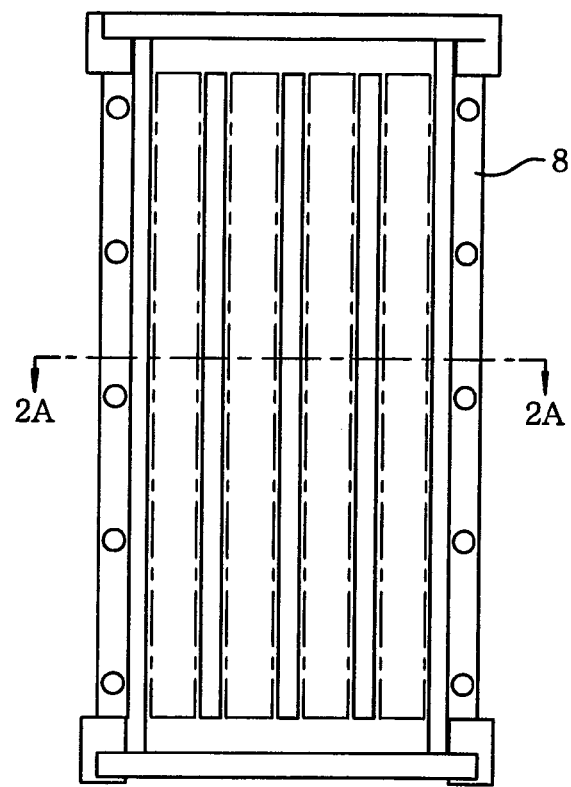
FIGS. 2A and 2B illustrate a plane view and a cross sectional view of a heat storage panel in accordance with a second embodiment of the present invention, respectively.
Figure 2B:
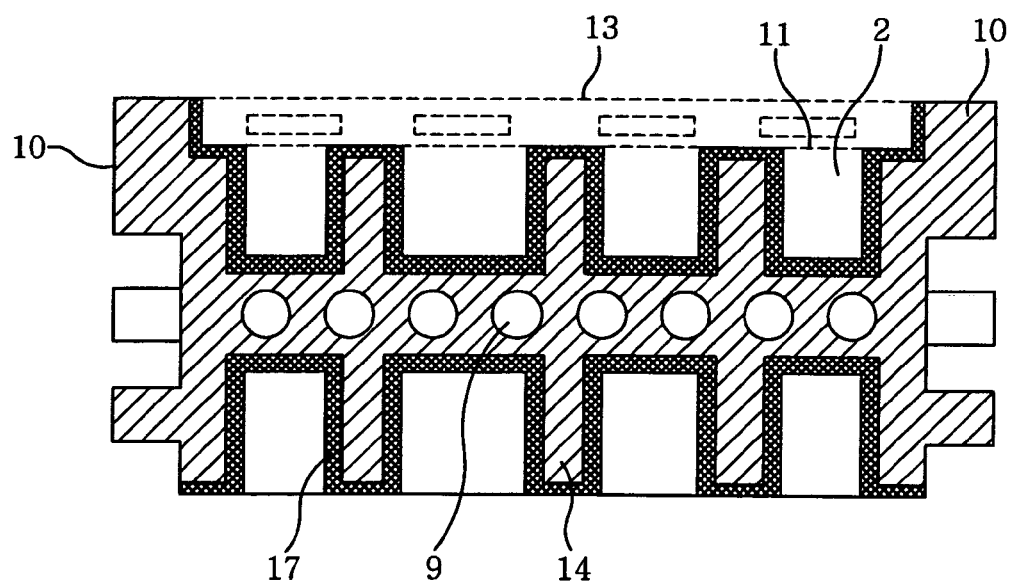

FIGS. 2A and 2B illustrate a plane view and a cross sectional view of a heat storage panel in accordance with a second embodiment of the present invention, respectively.

As shown therein, section bars 10 in heat storage panel 8 are formed of extruded aluminum, and corrosion protecting films 17 are formed on external surfaces of section bars 10 at which section bars 10 come into contact with heat reservoirs 11 containing heat storage medium 2 such as sodium acetate trihydrate.

Hereinafter, the operations and the performances of the heat storage apparatus configured as above will be described.

Although both surfaces of section bars 10 formed of extruded aluminum come into contact with heat reservoirs 11 containing heat storage medium 2 such as sodium acetate trihydrate, since corrosion protecting films 17 are formed on both surfaces of section bar 10, heat storage medium 2 can be prevented from being deteriorated by a corrosion of the aluminum and an elution of ions from aluminum to heat storage medium 2 when heat storage medium 2 comes into a direct contact with the aluminum.

As described above, in accordance with the second embodiment, the aluminum is prevented from making direct contact with heat storage medium 2 as a consequence of corrosion protecting films 17 being formed on the external surfaces of section bars 10 formed of extruded aluminum, resulting in preventing the corrosion of aluminum and protecting heat storage medium 2 from being deteriorated.

Embodiment 3

Figure 3A:
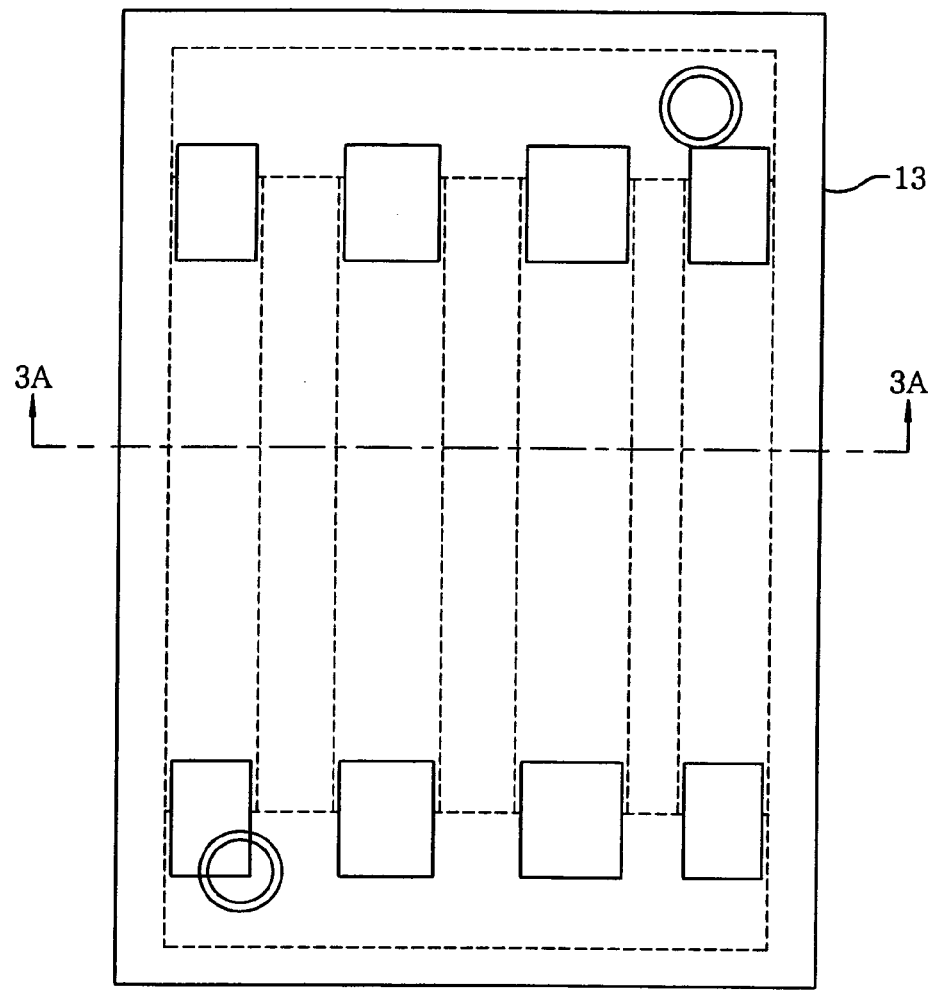
FIGS. 3A and 3B depict a plane view and a cross sectional view of a passage plate in accordance with a third embodiment of the present invention, respectively.
Figure 3B:
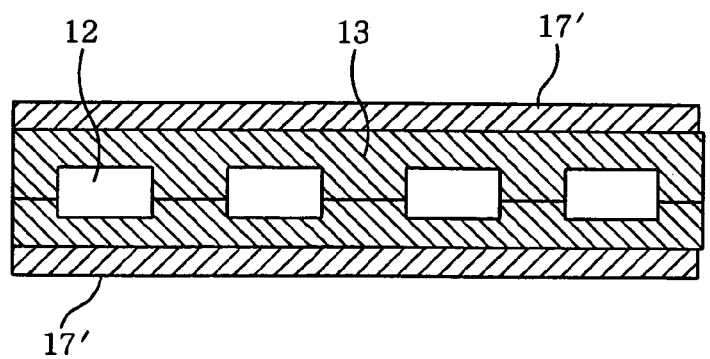

FIGS. 3A and 3B depict a plane view and a cross sectional view of a passage plate in accordance with a third embodiment of the present invention, respectively.

As shown therein, passage plates 13 are formed of copper plates, and corrosion protecting films 17' of chrome plating or the like are formed on external surfaces of section bars 10 at which section bars 10 come into contact with heat storage medium 2.

Hereinafter, the operations and the performances of the heat storage apparatus configured as above will be described.

When heat storage panels 8 and passage plates 13 are layered, surfaces of passage plates 13 come into contact with heat storage medium 2 and protrusions 14 of section bars 9. However, since passage plates 13 are formed of copper plates whose thermal conductivity is high, heat can be transferred efficiently from heat storage medium 2 to the secondary fluid. Further, the corrosion of the copper plates can be prevented as a consequence of corrosion protecting films 17' being formed on the surfaces of passage plates 13.

As described above, in accordance with the third embodiment, the copper plates are prevented from coming into direct contact with heat storage medium 2 as a consequence of corrosion protecting films 17' being formed on the external surfaces of passage plates 13 formed of copper plates. Thus, the heat transfer can be performed more efficiently, and the corrosion of aluminum can be prevented to thereby protect heat storage medium 2 from being deteriorated.

Embodiment 4

Figure 4A:
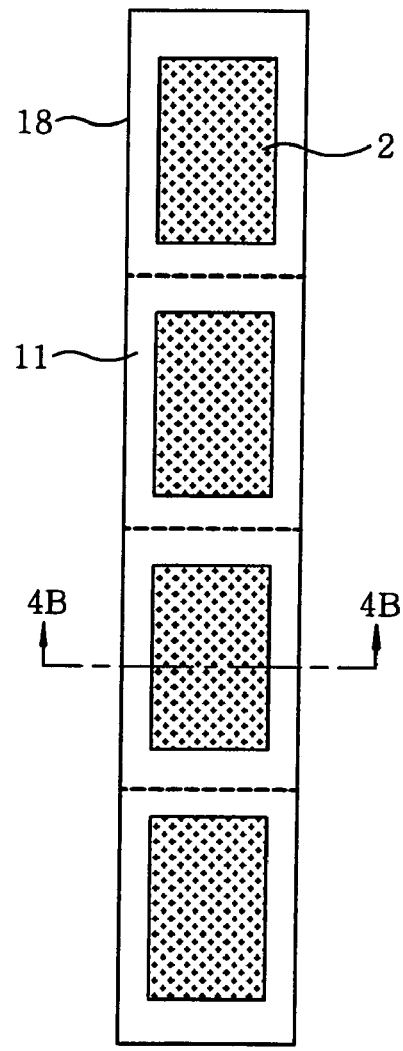
FIGS. 4A and 4B present a plane view and a cross sectional view of a heat reservoir in accordance with a fourth embodiment of the present invention, respectively.
Figure 4B:
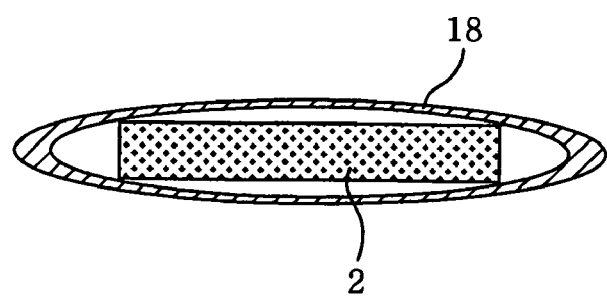

FIGS. 4A and 4B present a plane view and a cross sectional view of a heat reservoir in accordance with a fourth embodiment of the present invention, respectively.

As shown therein, heat reservoirs 11 contain a plurality of heat storage media 2 separately in envelope-shaped containers 18 having thin films of, e.g., polyethylene.

Hereinafter, the operations and the performances of the heat storage apparatus configured as above will be described. The plurality of heat storage media 2 are stored in envelope-shaped containers 18 in such a way that heat storage media 2 filled in envelope-shaped containers 18 are separated by using a method of, e.g., heat welding, making it easier to install heat reservoirs 11 in heat storage panels 8, and making it possible to prevent corrosion of metal such as aluminum or copper.

As described above, in accordance with the fourth embodiment, since the plurality of heat storage media 2 are separately stored in envelope-shaped containers 18, heat reservoirs 11 can be filled up after the heat storage apparatus is assembled, which, in turn allows heat storage media 2 to come into contact with constituent material of heat storage reservoirs 11 not directly but via envelope-shaped containers 18, thereby allowing aluminum or copper whose thermal conductivity is high to be used as the constituent material of heat storage reservoirs 11 without a surface treatment.

Embodiment 5

Figure 5:
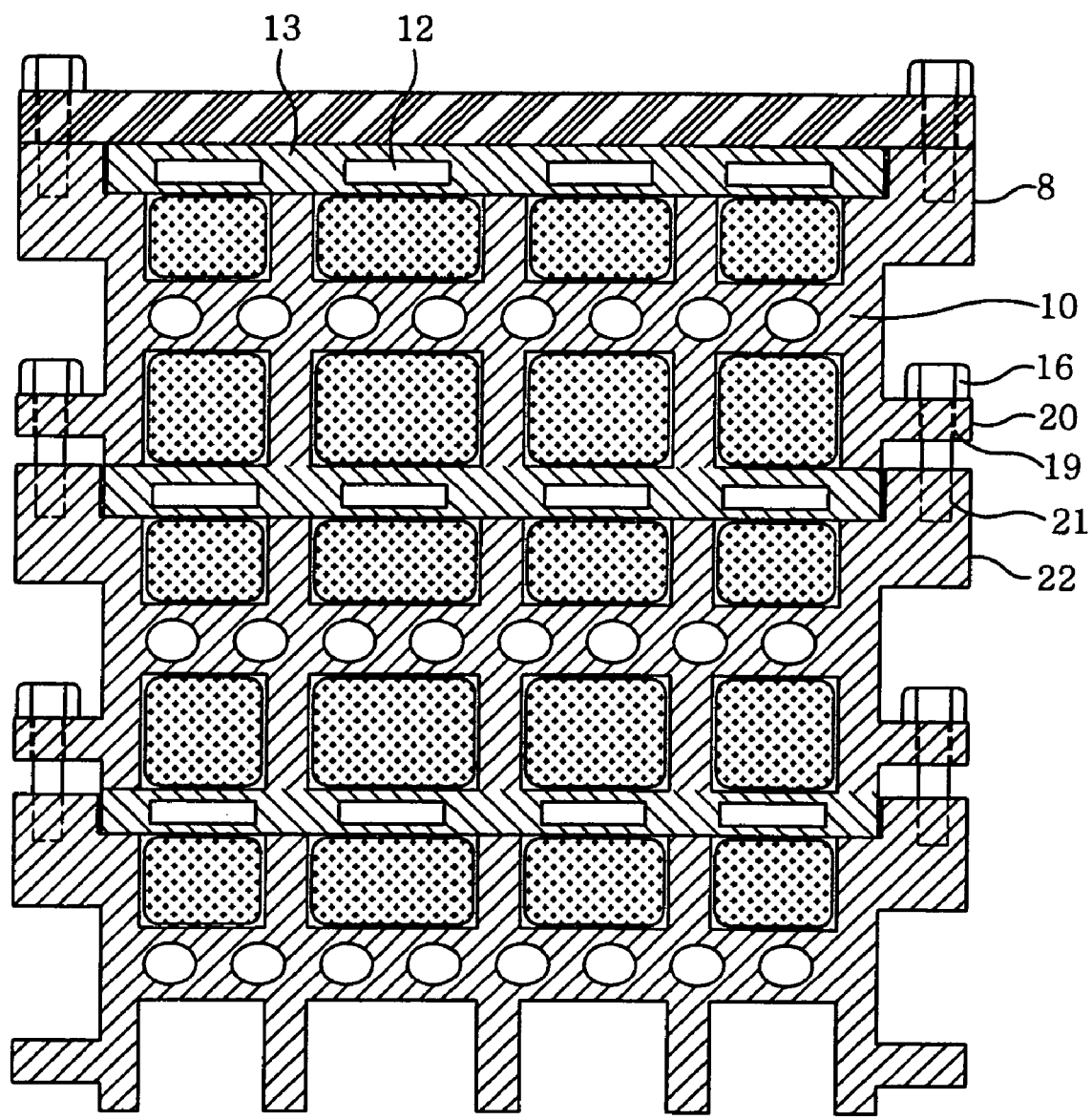
FIG. 5 offers a configuration diagram of a heat storage apparatus in accordance with a fifth embodiment of the present invention.

FIG. 5 provides a configuration diagram of a heat storage apparatus in accordance with a fifth embodiment of the present invention.

As shown therein, via protrusions 20 and fixing protrusions 22 are formed at both sides of each of section bars 10 in heat storage panels 8, wherein via protrusions 20 have through holes 19, and fixing protrusions 22 have female threads 21.

Hereinafter, the operations and the performances of the heat storage apparatus configured as above will be described.

When heat storage panels 8 and passage plates 13 are layered, fasteners 16 are inserted into through holes 19 in via protrusions 20 formed at the both ends of each of section bars 10, and then fixed into female threads 21 in via protrusions 22 in an adjacent section bar 10.

As described above, in accordance with the fifth embodiment, as a consequence of fasteners 16 being inserted into through holes 19 in via protrusions 20, and then fixed into female threads 21 in via protrusions 22 in an adjacent section bar 10, heat reservoirs 11 get firmly attached to section bars 10. Further, passage plates 13 are inserted between protrusions 14 of section bars 10 to be firmly fixed thereto, and firmly attached to heat reservoirs 11 as well. Thus, internal pressures of passage plates 13 are increased to make it possible to allow a large amount of secondary fluid to flow in secondary fluid passages, making it possible to efficiently transfer heat from/to heat reservoirs 11.

Embodiment 6

Figure 6:
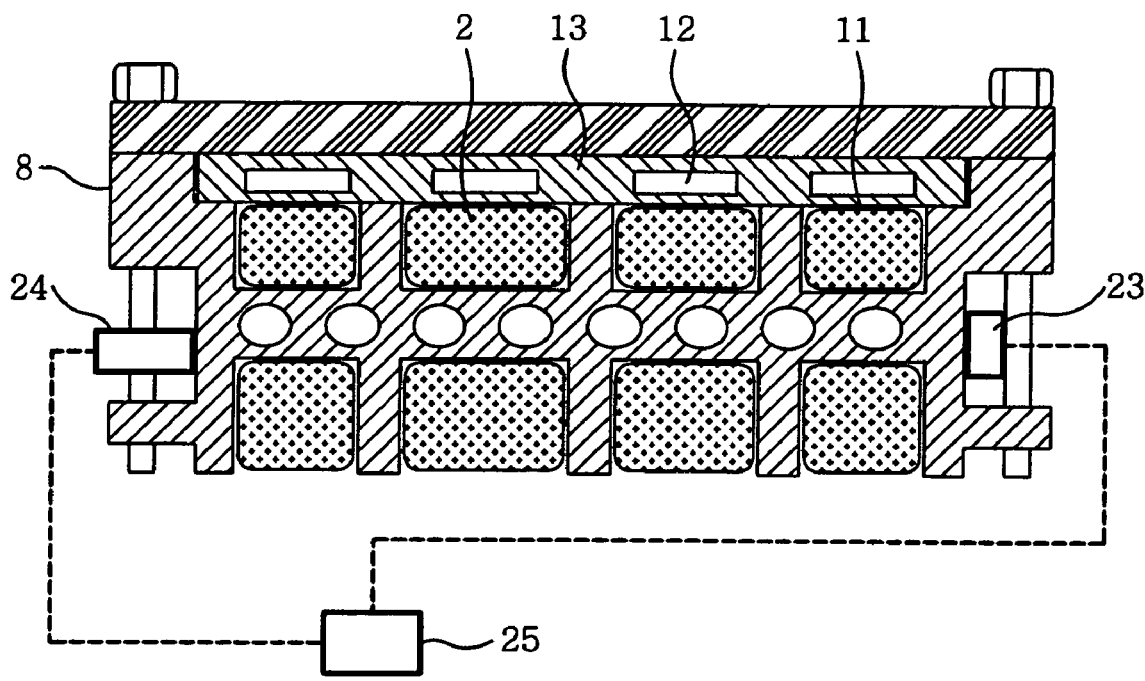
FIG. 6 shows a configuration diagram of a heat storage apparatus in accordance with a sixth embodiment of the present invention.

FIG. 6 offers a configuration diagram of a heat storage apparatus in accordance with a sixth embodiment of the present invention.

As shown therein, heat storage panel 8 includes heat storage medium temperature detector 23 and heat storage medium vibrator 24 installed at side walls of accommodating portions of heat storage reservoirs 11, and further includes controller 25 for controlling heat storage medium vibrator 24 in response to an output of heat storage medium temperature detector 23.

Hereinafter, the operations and the performances of the heat storage apparatus configured as above will be described.

In case of a heat release, heat storage medium 2 in heat reservoir 11 is in a melted state at a high temperature, and cold water is made to flow in secondary fluid passage 12 in passage plate 13 to transfer heat from heat storage medium 2 to water. Thus, the temperature of the water increases as it flows further, and heat storage medium 2 releases heat so that its temperature decreases gradually to near the freezing point of heat storage medium 2. However, if latent heat storage material such as sodium acetate trihydrate is used as heat storage medium 2, a super-cooling effect occurs, preventing heat storage medium 2 from being frozen and allowing the temperature thereof to continue to drop even after it reaches the freezing point, thereby making it difficult to extract the latent heat. However, even in this case, since heat storage medium temperature detector 23 detects whether the temperature of heat storage medium 2 has reached the freezing point, and, if so, controller 25 activates heat storage medium vibrator 24 to be vibrated, vibrating heat storage medium 2 to boost the freezing reaction. Thus, latent heat can be extracted at a specific temperature.

As described above, in accordance with the sixth embodiment, the freezing reaction is boosted so that latent heat can be extracted at a specific temperature by installing heat storage medium temperature detector 23, heat storage medium vibrator 24 and controller 25, and vibrating heat storage medium 2 when the temperature of heat storage medium 2 reaches the freezing point.

Embodiment 7

Figure 7:
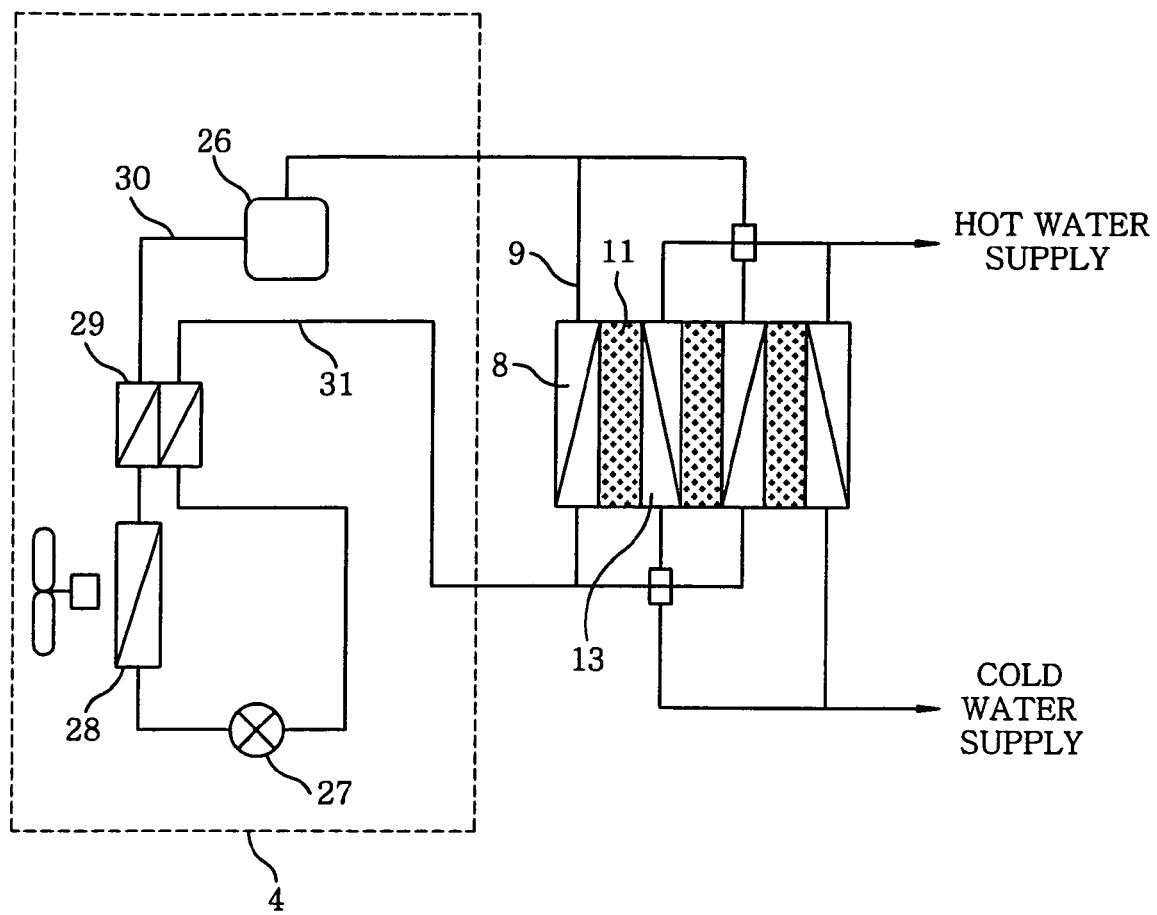
FIG. 7 illustrates a configuration diagram of a heat storage apparatus in accordance with a seventh embodiment of the present invention.

FIG. 7 offers a configuration diagram of a heat storage apparatus in accordance with a seventh embodiment of the present invention.

As shown therein, heat source 4 configured by a heat pump circuit includes compressor 26; expansion valve 27; evaporator 28; heat exchanger 29; and heat storage panel 8 serving as a heat radiator.

Hereinafter, the operations and the performances of the heat storage apparatus configured as above will be described.

Firstly, a coolant gas is made into a high-temperature and high-pressure state by compressor 26, and then made to flow in primary fluid passage 9 in heat storage panel 8 to transfer heat into heat storage reservoir 11, lowering the temperature of the coolant gas. Then, heat exchanger 29 heats an inlet gas of compressor 26, and the gas is changed into a low-temperature and low-pressure liquid by expansion valve 27. Subsequently, the low-temperature and low-pressure liquid gains heat from evaporator 28 to be evaporated, and then flows into compressor 26 in a gaseous state.

As described above, in accordance with the seventh embodiment, since the coolant gas of a high temperature and a high pressure is made to flow in primary fluid passage 9 in heat storage panel 8, heat generated by heat source 4 configured by a heat pump circuit is transferred directly to heat reservoir 11. Thus, heat is efficiently stored in heat reservoir 11 with a simple configuration, and a secondary heat transfer medium is not needed. If a carbonate gas is used as the coolant gas, the coolant gas passes through primary fluid passage 9 without being liquidized. In this case, although an efficiency of the heat radiation is reduced, the effect as described above can be still achieved. Thus, the temperature of the inlet gas of compressor 26 can be raised by heat exchanger 29 to thereby raise the temperature of the coolant gas flowing into primary fluid passage 9, allowing heat storage medium 2 to be used efficiently.

Embodiment 8

Figure 8A:
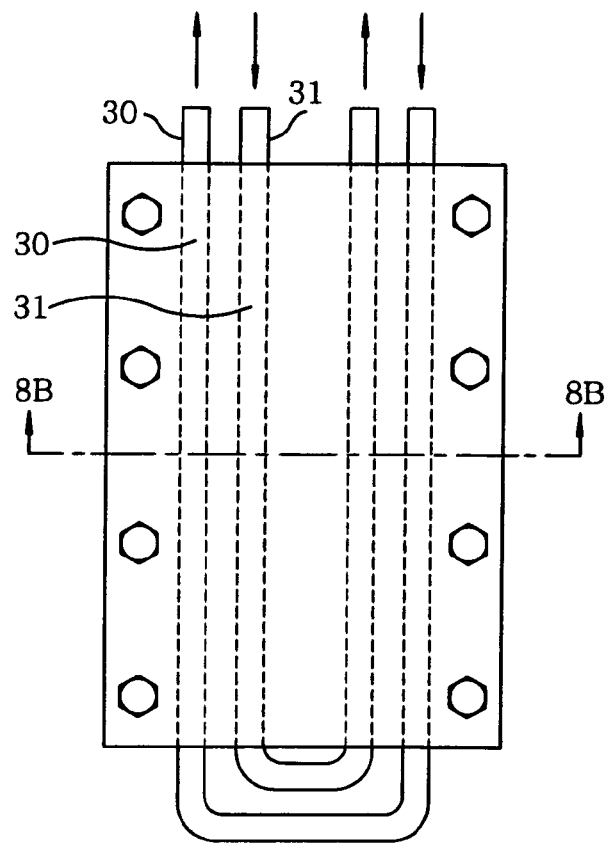
FIGS. 8A and 8B present a plane view and a cross sectional view of an end plate in accordance with an eighth embodiment of the present invention, respectively.
Figure 8B:
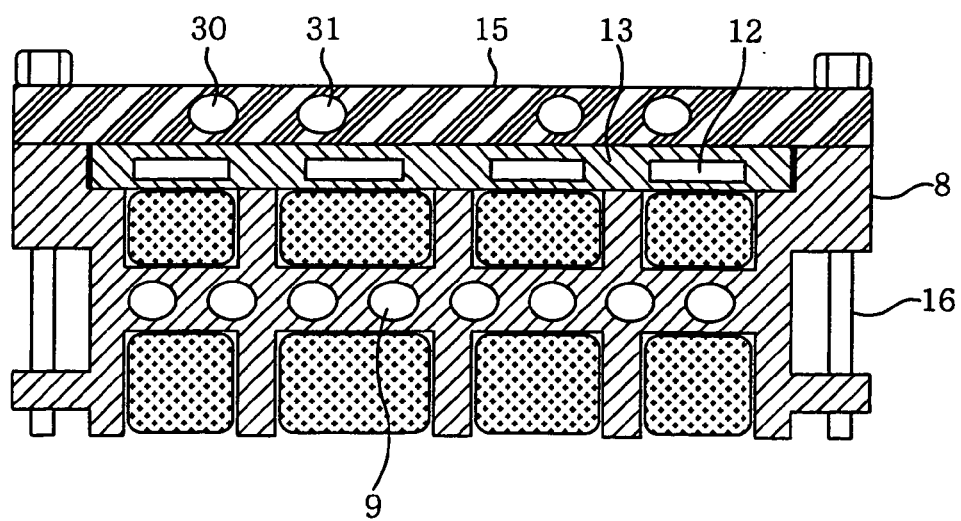

FIGS. 8A and 8B present a plane view and a cross sectional view of an end plate in accordance with an eighth embodiment of the present invention, respectively.

As shown therein, end plate 15, which fastens heat storage panels 8 and passage plates 13 layered alternately by means of fasteners 16, includes compressor inlet passageway 30 and radiator outlet passageway 31 of heat exchanger 29.

Hereinafter, the operations and the performances of the heat storage apparatus configured as above will be described.

When storage panels 8 and passage plates 13 layered alternately are fixed to each other by fasteners 16, end plate(s) 15 placed at a top layer and/or a bottom layer of storage panels 8 and passage plates 13 is/are needed to support them. However, in the eighth embodiment, since end plate 15 has compressor inlet passageway 30 and radiator outlet passageway 31, heat is exchanged between the inlet gas of compressor 26 and the condensate.

As described above, in accordance with the eighth embodiment, since end plate has compressor inlet passageway 30 and radiator outlet passageway 31, heat is exchanged between the inlet gas of compressor 26 and the condensate with a simple configuration. Thus, the heat storage apparatus can be made smaller, and a heat storage can be made to perform with a high efficiency.

Embodiment 9

Figure 9:
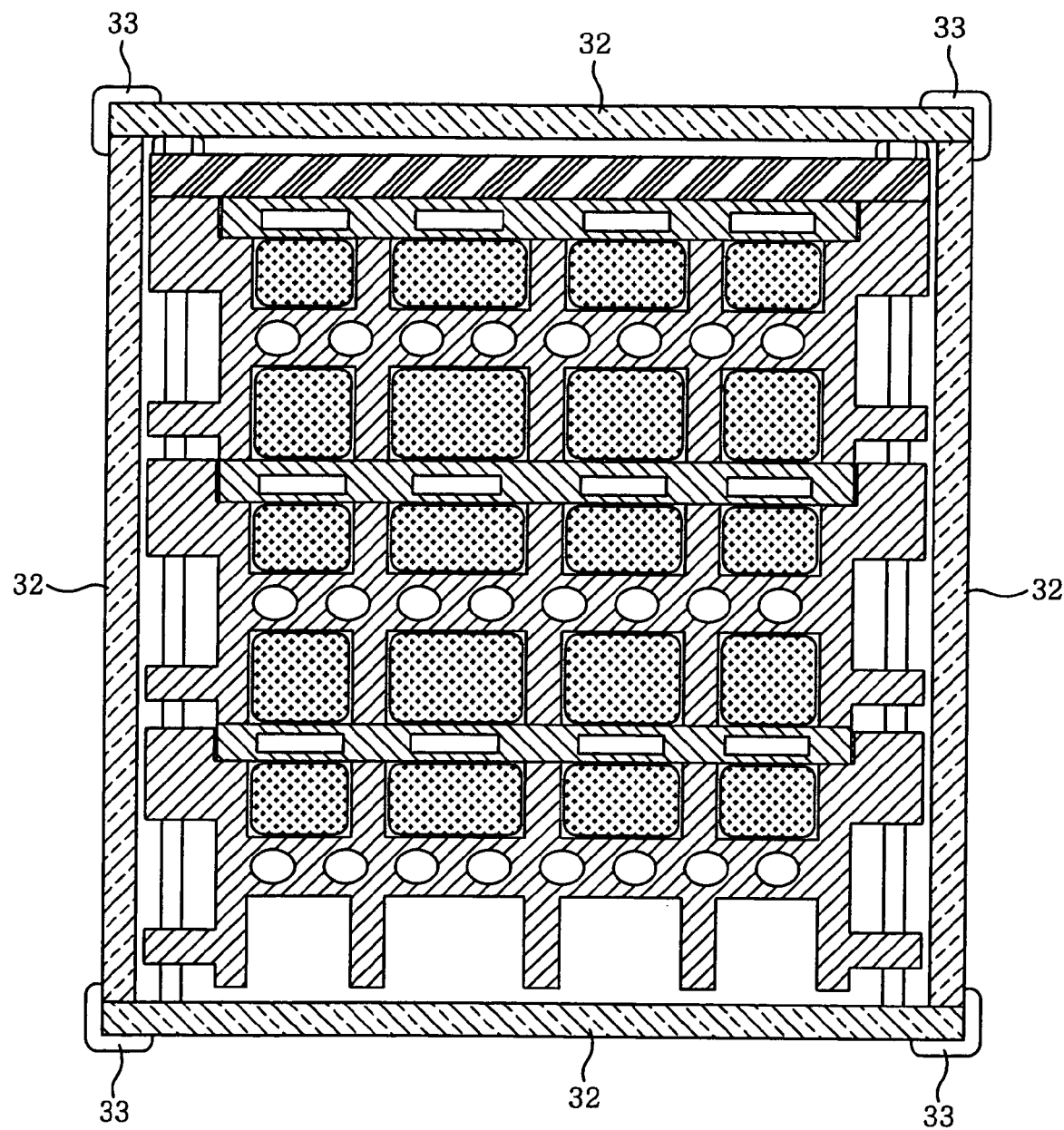
FIG. 9 offers a configuration diagram of a heat storage apparatus in accordance with a ninth embodiment of the present invention.
Figure 10:
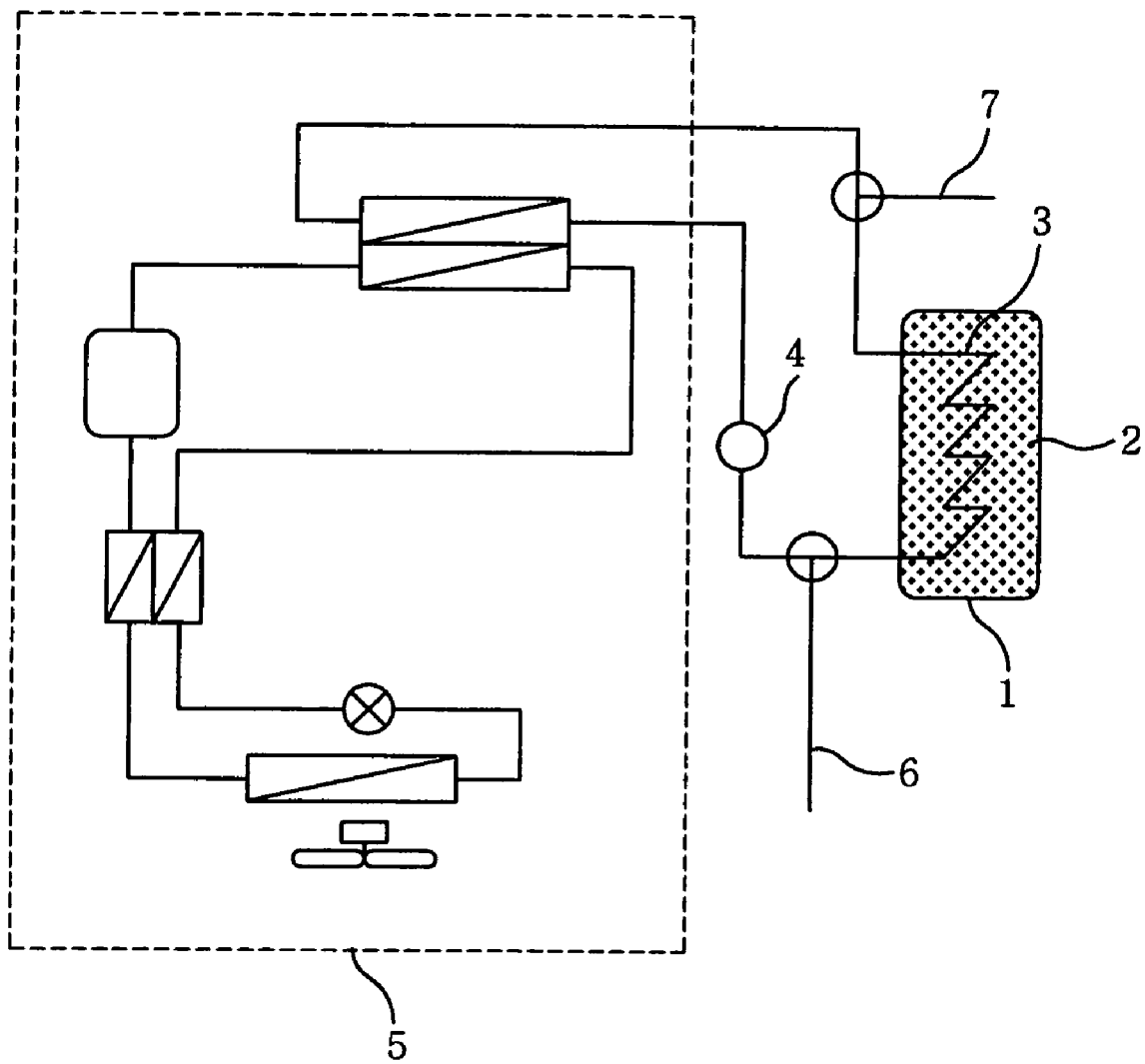
FIG. 10 depicts a configuration diagram of a conventional heat storage apparatus.

FIG. 9 is a configuration diagram of a heat storage apparatus in accordance with a ninth embodiment of the present invention.

As shown therein, outer surfaces of the layered heat storage panels 8 are covered with vacuum insulator plates 32, and junctions of vacuum insulator plate 32 are bound by binding members 33 made of, e.g., packing material of vacuum insulator plates 32.

Hereinafter, the operations and the performances of the heat storage apparatus configured as above will be described.

Vacuum insulator plates 32 are adhered onto the outer surfaces of square-shaped heat storage tank 1 formed by layering heat storage panels 8, and the junctions where vacuum insulator plates 32 come into contact with each other are bound by binding members 33, thereby thermally insulating heat storage panels 8.

As described above, in accordance with the ninth embodiment, since outer surfaces of the square-shaped heat storage tank 1 formed by layering heat storage panels 8 are covered with vacuum insulator plates 32 and then fixed thereto by binding members 33, vacuum insulator plates 32, which have a good thermal insulating properties but are difficult to be bent, can be used as an insulator. Thus, it is possible to implement a small-sized heat storage apparatus of a low heat loss and a high efficiency.

As described above, the heat storage apparatus in accordance with the present invention, capable of achieving a high efficiency and reliability, can be applied to household heating systems, bathroom heating and drying systems, clothes driers, and waste heat recovering apparatuses.

As described above, in accordance with the present invention, it is possible to provide a high-efficiency heat storage apparatus by enhancing the availability of the heat storage medium.

While the invention has been shown and described with respect to the preferred embodiments, it will be understood by those skilled in the art that various changes and modification may be made without departing from the scope of the invention as defined in the following claims.

What is claimed is:

1. A heat storage apparatus, comprising:
   heat storage panels having primary fluid passages formed therein;
   passage plates having secondary fluid passages formed therein wherein protrusions are formed on surfaces of the heat storage panels and extending toward the passage plates in such a manner that the heat reservoirs are supported by the protrusions; and
   heat reservoirs,
   wherein the heat storage panels and the passage plates are layered alternately, and the heat reservoirs are interposed between the heat storage panels and the passage plates in such a manner that the heat reservoirs, the heat storage panels and the passage plates are adhered to one another,
   wherein the heat reservoirs include envelope-shaped containers made of thin films, and heat storage media are completely enclosed within the envelope-shaped containers, and
   wherein the heat reservoirs are configured to absorb heat from primary fluid flowing through the primary fluid passages, store the absorbed heat in the heat storage media, and transfer the stored heat to secondary fluid flowing through the secondary fluid passages.

2. The heat storage apparatus of claim 1, wherein the heat storage panels include section bars made of extruded aluminum, and corrosion protecting films are formed on outer surfaces of the section bars.

3. The heat storage apparatus of claim 1, wherein the passage plates are formed of copper plates, and corrosion protecting films are formed on outer surfaces of the copper plates.

4. The heat storage apparatus of claim 1, wherein via protrusions having through holes and fixing protrusions having female threads are formed at sides of each of the section bars in the heat storage panels in such a manner that the heat storage panels are fixed to the passage plates.

5. The heat storage apparatus of claim 1, further comprising:
   a heat storage medium temperature detector;
   a heat storage medium vibrator; and
   a controller for controlling an operation of the heat storage medium vibrator in response to an output of the heat storage medium temperature detector.

6. The heat storage apparatus of claim 1, wherein outer surfaces of the heat storage apparatus are covered with vacuum insulators, and bound by binding members.

7. A hot water supplier, comprising:
   a heat pump circuit including:
      a compressor;
      a heat radiator;
      an expansion valve;
      an evaporator; and
      a heat exchanger for exchanging heat between the heat radiator and the evaporator,
   wherein the compressor, the heat radiator, the expansion valve and the evaporator are connected serially in this order, and
   wherein the heat storage panels of any one of the claims 1 to 4 are used as the heat radiator.

8. The hot water supplier of claim 7, further comprising:
   end plates for binding and supporting the heat storage panels and the passage plates, the end plates including a compressor inlet passageway and a radiator outlet passageway used for the heat exchanger.

9. A heat storage apparatus, comprising:
   heat storage panels having primary fluid passages formed therein;
   passage plates having secondary fluid passages formed therein wherein protrusions are formed on surfaces of the heat storage panels and extending toward the passage plates in such a manner that the heat reservoirs are supported by the protrusions; and
   heat reservoirs,
   wherein the heat storage panels and the passage plates are layered alternately, and the heat reservoirs are interposed between the heat storage panels and the passage plates in such a manner that the heat reservoirs, the heat storage panels and the passage plates are adhered to one another,
   wherein an inner edge of each of the heat storage panels surrounds an outer periphery of each of the passage plates,
   wherein the heat reservoirs include envelope-shaped containers made of thin films, and heat storage media are completely enclosed within the envelope-shaped containers, and
   wherein the heat reservoirs are configured to absorb heat from primary fluid flowing through the primary fluid passages, store the absorbed heat in the heat storage media, and transfer the stored heat to secondary fluid flowing through the secondary fluid passages.

10. The heat storage apparatus of claim 1, wherein the thin films are formed to surround the heat reservoirs.

11. The heat storage apparatus of claim 1, wherein the thin films are formed on external surfaces of the passage plates.

12. The heat storage apparatus of claim 1, wherein the heat storage panels and passage plates supporting the heat reservoirs are alternately layered and fixed by fasteners, allowing the passage plates to be fixed to protrusions, the heat reservoirs are adhered on section bars and passage plates are layered.

13. The heat storage apparatus of claim 9, wherein the heat storage panels and passage plates supporting the heat reservoirs are alternately layered and fixed by fasteners, allowing the passage plates to be fixed to protrusions, the heat reservoirs are adhered on section bars and passage plates are layered.

* * * * *

UNITED STATES PATENT AND TRADEMARK OFFICE
CERTIFICATE OF CORRECTION

| | | |
|---|---|---|
| PATENT NO. | : 7,793,651 B2 | |
| APPLICATION NO. | : 11/392594 | |
| DATED | : September 14, 2010 | |
| INVENTOR(S) | : Takashi Sawada et al. | |

It is certified that error appears in the above-identified patent and that said Letters Patent is hereby corrected as shown below:

In claim 7, line 13, change "4" to --6--.

Signed and Sealed this
Twenty-fourth Day of April, 2012

David J. Kappos
*Director of the United States Patent and Trademark Office*

UNITED STATES PATENT AND TRADEMARK OFFICE
CERTIFICATE OF CORRECTION

PATENT NO.         : 7,793,651 B2                                          Page 1 of 1
APPLICATION NO.    : 11/392594
DATED              : September 14, 2010
INVENTOR(S)        : Takashi Sawada et al.

It is certified that error appears in the above-identified patent and that said Letters Patent is hereby corrected as shown below:

Column 9, line 16 (claim 7, line 13) change "4" to --6--.

This certificate supersedes the Certificate of Correction issued April 24, 2012.

Signed and Sealed this
Fifteenth Day of May, 2012

David J. Kappos
*Director of the United States Patent and Trademark Office*

UNITED STATES PATENT AND TRADEMARK OFFICE
CERTIFICATE OF CORRECTION

PATENT NO. : 7,793,651 B2
APPLICATION NO. : 11/392594
DATED : September 14, 2010
INVENTOR(S) : Takashi Sawada et al.

It is certified that error appears in the above-identified patent and that said Letters Patent is hereby corrected as shown below:

In Item 73, please change "Matsushita Electric Industrial Co., Ltd., Osaka (JP)" to
--Panasonic Corporation, Osaka (JP)--

Signed and Sealed this
Thirty-first Day of July, 2012

David J. Kappos
*Director of the United States Patent and Trademark Office*